United States Patent
Ramachandran et al.

(10) Patent No.: US 7,865,045 B2
(45) Date of Patent: Jan. 4, 2011

(54) LOCALLY PERTURBED OPTICAL FIBERS FOR MODE TRANSFORMERS

(75) Inventors: Siddharth Ramachandran, Hoboken, NJ (US); Mikhail Sumetsky, Bridgewater, NJ (US); Paul S. Westbrook, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/157,214

(22) Filed: Jun. 9, 2008

(65) Prior Publication Data

US 2009/0080470 A1    Mar. 26, 2009

Related U.S. Application Data

(63) Continuation-in-part of application No. 11/903,759, filed on Sep. 25, 2007, now abandoned.

(51) Int. Cl.
G02B 6/26    (2006.01)
G02B 6/42    (2006.01)
G02B 6/34    (2006.01)
H01S 3/00    (2006.01)
H01S 3/30    (2006.01)
H04B 10/12    (2006.01)

(52) U.S. Cl. .................. 385/28; 385/37; 359/333; 359/341.1; 359/341.3; 372/6

(58) Field of Classification Search .............. 385/28, 385/37

See application file for complete search history.

(56) References Cited

U.S. PATENT DOCUMENTS

| 5,848,204 | A * | 12/1998 | Wanser ............... 385/12 |
| 6,337,937 | B1 * | 1/2002 | Takushima et al. ....... 385/28 |
| 6,999,659 | B1 * | 2/2006 | Nowak et al. ........... 385/37 |
| 7,110,651 | B2 * | 9/2006 | Golowich et al. ....... 385/126 |
| 2004/0036955 | A1 * | 2/2004 | Digonnet et al. ....... 359/341.1 |
| 2006/0093012 | A1 * | 5/2006 | Singh et al. ........... 372/102 |

OTHER PUBLICATIONS

"Generation of selective fringes with cascaded long-period gratings," by Villar et al, IEEE Photonics Technology Letters, vol. 18, No. 13, Jul. 2006, pp. 1412-1414.*

* cited by examiner

*Primary Examiner*—Ryan Lepisto
*Assistant Examiner*—Robert Tavlykaev
(74) *Attorney, Agent, or Firm*—Law Office of Peter V.D. Wilde; Michael A. Morra

(57) ABSTRACT

The specification describes optical devices and related methods wherein an input mode is converted by multiple LPG mode transformers to produce an output with multiple predetermined modes.

23 Claims, 5 Drawing Sheets

LOCALLY PERTURBED OPTICAL FIBERS FOR MODE TRANSFORMERS

RELATED APPLICATION

This application is a Continuation-in-Part of application Ser. No. 11/903,759, filed Sep. 25, 2007.

FIELD OF THE INVENTION

The invention relates to optical fiber mode controlling devices.

BACKGROUND OF THE INVENTION

Optical fiber and optical waveguide mode converters are well known and come in a variety of forms. They operate typically by transforming an input mode, usually a fundamental mode, into a higher order mode, or vice versa. An especially attractive mode converter device comprises a long period grating (LPG) formed in an optical fiber. See for example, U.S. Pat. No. 6,768,835, and T. Erdogan, "Fiber grating spectra," J. Lightwave Technology vol. 15, p. 1277 (1997).

These mode converters operate with a single mode input, and typically a single mode output. Propagating light in more than one mode at a time, and controllably changing the mode of more than one mode at a time, would be an attractive goal, but to date not achieved.

SUMMARY OF THE INVENTION

I have designed an optical device and related method wherein a single mode input or a multiple mode input are respectively converted by multiple mode transformers to produce an output with predetermined modes that may be different from the input. In one embodiment the input is multiple modes and the output mode is a single mode. In another embodiment the input is a single mode and the output is multiple modes. In another embodiment the power ratios of the output modes are controllably changed. In another embodiment one or more output modes is different from the input mode(s).

DETAILED DESCRIPTION

Figure 1:
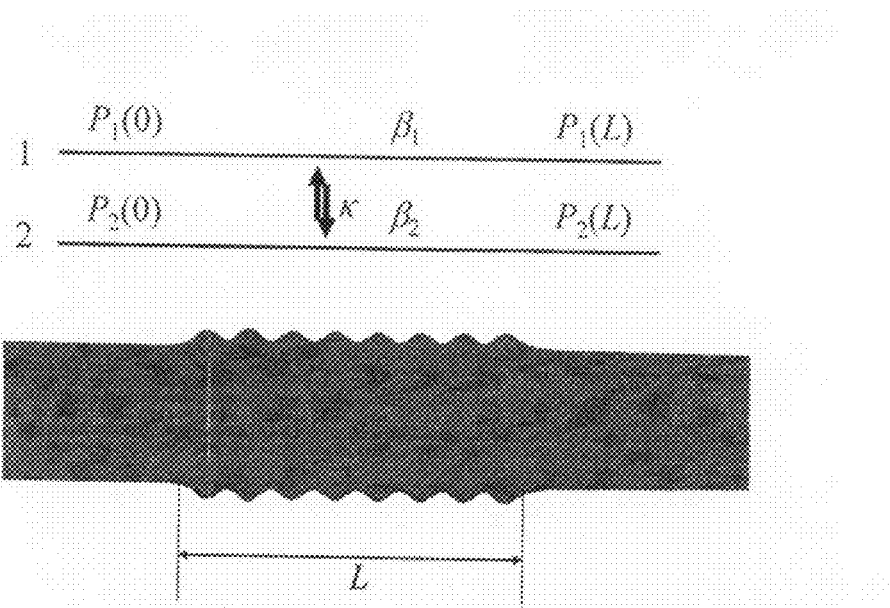
FIG. 1 shows a mode transformer diagram and a schematic form of a mode transformer according to one embodiment of the invention.

The simplest case of coupling between several copropagating modes is coupling between two modes. Conversion between two modes can be performed with a long period grating (LPG), which periodically changes the effective refractive index of the fiber according to the following equation:

$$n_{\text{eff}}(z) = n_0 + \Delta n \cos\left(\frac{2\pi}{\Lambda} z + \theta\right) \quad (1)$$

where $\Lambda$ is the period of the LPG. Assume that the LPG starts at z=0 and ends at z=L (see FIG. 1). Consider modes 1 and 2 having the propagation constants $\beta_1$ and $\beta_2$, respectively. For determinacy, assume that $\beta_2 > \beta_1$. In the absence of LPG, at z<0, modes 1 and 2 have the form:

$$E_1(x, y, z) = C_{10} \exp(i\beta_1 z + i\phi_1) e_1(x, y),$$

$$E_2(x, y, z) = C_{20} \exp(i\beta_2 z + i\phi_2) e_2(x, y) \quad (2)$$

Here z is the coordinate along the fiber, x, y are the transverse coordinates, $e_j(x, y)$ are the real-valued transverse mode distribution, and $C_{j0}$ and $\phi_j$ are constants, which determine the amplitudes and the phases of modes, respectively. When these modes enter the section of the fiber containing the LPG, the coordinate dependence can be written in the form:

$$E_1(x, y, z) = A_1(z)\exp\left\{i\left[\beta_1 - \delta + \frac{1}{2}(\sigma_{11} + \sigma_{22})\right]z + \frac{i}{2}\theta\right\}e_1(x, y) \quad (3)$$

$$E_2(x, y, z) = A_2(z)\exp\left\{i\left[\beta_2 + \delta + \frac{1}{2}(\sigma_{11} + \sigma_{22})\right]z - \frac{i}{2}\theta\right\}e_2(x, y),$$

where $$\delta = \frac{1}{2}(\beta_1 - \beta_2) + \frac{\pi}{\Lambda}, \quad (4)$$

$\sigma_{jj}$ are the "dc" coupling coefficients [see e.g. T. Erdogan, "Fiber grating spectra," J. Lightwave Technology vol. 15, p. 1277 (1997)], and $A_j(z)$ are the functions, which are determined by the coupling wave equations:

$$\frac{dA_1}{dz} = i\sigma A_1 + i\kappa A_2 \quad (5)$$

$$\frac{dA_2}{dz} = i\kappa A_2 - i\sigma A_2$$

Here $\sigma$ is the general "dc" self-coupling coefficient and $\kappa$ is the "ac" cross-coupling coefficient. Comparing Eq. (2) and Eq. (3), the initial conditions for $A_j(z)$ are:

$$A_1(0) = C_{10}\exp\left[i\left(\varphi_1 - \frac{\theta}{2}\right)\right] \quad (6)$$

$$A_2(0) = C_{20}\exp\left[i\left(\varphi_2 + \frac{\theta}{2}\right)\right]$$

Solution of Eq. (5) is:

$$A_1(z) = \left(\cos(\mu z) + i\frac{\sigma}{\mu}\sin(\mu z)\right)A_1(0) + i\frac{\kappa}{\mu}\sin(\mu z)A_2(0) \quad (7)$$

-continued $$A_2(z) = i\frac{\kappa}{\mu}\sin(\mu z)A_1(0) + \left(\cos(\mu z) - i\frac{\sigma}{\mu}\sin(\mu z)\right)A_2(0)$$

where $\mu=\sqrt{\sigma^2+\kappa^2}$. The power of the mode j is determined as:

$$P_j(z) = \int dx dy E_j(x,y,z)E^*_j(x,y,z) = |A_j(z)|^2 \quad (8)$$

Here it is assumed that the transverse components of the modes are normalized:

$$\int dx dy e_j(x,y)e^*_j(x,y) = 1 \quad (9)$$

It is possible to find the LPG parameters $\theta$, $\sigma$, $\kappa$, and L, so that, for arbitrary $C_{j0}$ and $\phi_j$, the requested $A_j(L)$ at z=L can be obtained, which satisfy the energy conservation rule:

$$P_1(L) + P_2(L) = P_1(0) + P_2(0) \quad (10)$$

where $$P_j(0) = |A_j(0)|^2, \; P_j(L) = |A_j(L)|^2 \quad (11)$$

The corresponding equations for $\sigma$, $\kappa$, and L are found from Eq. (7):

$$\cos(\mu L) = \text{Re} X \quad (12)$$

$$\frac{\kappa}{\mu} = -\frac{iY}{\sqrt{1-(\text{Re}X)^2}} \quad (13)$$

where $$X = \frac{A^*_1(0)A_1(L) + A_2(0)A^*_2(L)}{|A_1(0)|^2 + |A_2(0)|^2} \quad (14)$$

$$Y = \frac{A^*_2(0)A_1(L) - A_1(0)A^*_2(L)}{|A_1(0)|^2 + |A_2(0)|^2} \quad (15)$$

Eq. (13) is self-consistent only if the right hand side is real. From Eq. (15), the later condition is satisfied if $$Re(A^*_2(0)A_1(L)) = Re(A_1(0)A^*_2(L)). \quad (16)$$

Eq. (16) can be satisfied with appropriate choice of the LPG phase shift, $\theta$. Thus, the input modes 1 and 2, with arbitrary amplitudes and phases, can be converted into any other modes, with arbitrary amplitudes and phases, if the condition of the energy conservation, Eq. (10), is fulfilled.

In some applications, it may be necessary to convert two modes with known input powers, $P_1(0)$ and $P_2(0)$ into two modes with the requested power ratio $P_2(L)/P_1(L)$ and with no restrictions on the phases of $A_1(L)$ and $A_2(L)$. This conversion can be performed with the simplified LPG, which satisfies the phase matching condition, $\sigma=0$. For example, assume the condition that after passing the coupling region of length L, the light is completely transferred to mode 1 and mode 2 is empty:

$$P_1(L) = P_1(0) + P_2(0), \; P_2(L) = 0, \; P_j(L) = |A_j(L)|^2. \quad (17)$$

This condition can be satisfied independently of the initial phases of $A_1(0)$ and $A_2(0)$ only if one of the initial powers is zero. For example, if $P_1(0)=0$ then Eq. (4) is satisfied if $$\cos(\kappa L) = 0 \quad (18)$$

This result is used in mode conversion based on long period fiber gratings.

However, if both of initial powers $P_1(0)$ and $P_2(0)$ are not zeros, Eq. (17) can be satisfied when the initial phase difference between modes 1 and 2 is $$\arg(A_1(0)/A_2(0)) = \pm\frac{\pi}{2} \quad (19)$$

Then the condition of full conversion of modes 1 and 2 into mode 1 is:

$$\tan(\kappa L) = \frac{iA_2(0)}{A_1(0)} \quad (20)$$

The right hand side of this equation is real due to Eq. (19). Thus, in order to perform essentially full conversion of light, which is arbitrarily distributed between two modes, the initial phases of these modes should be adjusted and the coupling coefficient $\kappa$ and coupling length L should be chosen from Eq. (20). Furthermore, if the phase condition of Eq. (19) is satisfied then it can be shown that the powers of modes can be arbitrarily redistributed with the appropriate choice of coupling parameters. In fact, assume that the ratio of the input mode powers is $R_0 = P_1(0)/P_2(0)$. Then in order to arrive at the output mode ratio $R_L = P_1(L)/P_2(L)$, the coupling coefficient $\kappa$ may be defined from the equation:

$$\tan(\kappa L) = \mp\frac{R_0^{1/2} + R_L^{1/2}}{1 - (R_0 R_L)^{1/2}}, \quad (21)$$

where the signs $\mp$ correspond to $\pm$ in Eq. (19). Eq. (20) is derived from Eq. (7) for $\sigma=0$. For the condition of full mode conversion, $R_L=\infty$, Eq. (21) coincides with Eq. (18). Practically, Eq. (21) can be satisfied by choosing the appropriate LPG strength and length. Eq. (19) can be satisfied by changing the length of the fiber in front of LPG by heating, straining, or with other type of refractive index perturbation or deformation. Such perturbations and deformations are described in U.S. Pat. No. 6,768,835, which is incorporated herein by reference. This condition can be also satisfied by inscribing the LPG at the proper place along the fiber length.

This basic teaching can be extended to the more general case wherein light propagating along M modes with amplitudes $A_1^0, \ldots, A_M^0$ is converted to the same or other N modes with amplitudes $A_1^f, \ldots, A_M^f$. This can be done by a series of two or more mode couplers described above and illustrated in FIG. 2. Due to energy conservation:

$$P_1^0 + \ldots + P_M^0 = P_1^f + \ldots + P_N^0 = |A_j^{0,f}|^2. \quad (22)$$

Without loss of generality, assume M=N, which can be always done by adding empty modes. If $P_1^0$ is the largest power among the initial partial powers and $P_1^f$ is the smallest power among the final partial powers then, according to Eq. (22), we have $P_1^0 \geq P_1^f$. The first two-mode transformation fills mode 1 with the desired power: $P_1^0 + P_2^0 \to P_1^f + P_2'$ where $P_2' = P_1^0 + P_2^0 - P_1^f$. In the result of this transformation, the problem of conversion is reduced to the case of N−1 modes, which can be solved similarly. Thus, any power redistribution between two sets of N modes can be performed with a series of N−1 two-mode transformations as illustrated in FIG. 2.

Figure 2:
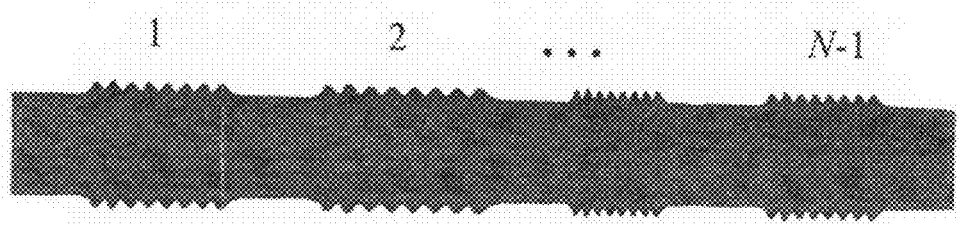
FIG. 2 is a schematic representation of multiple mode transformers.
Figure 3:
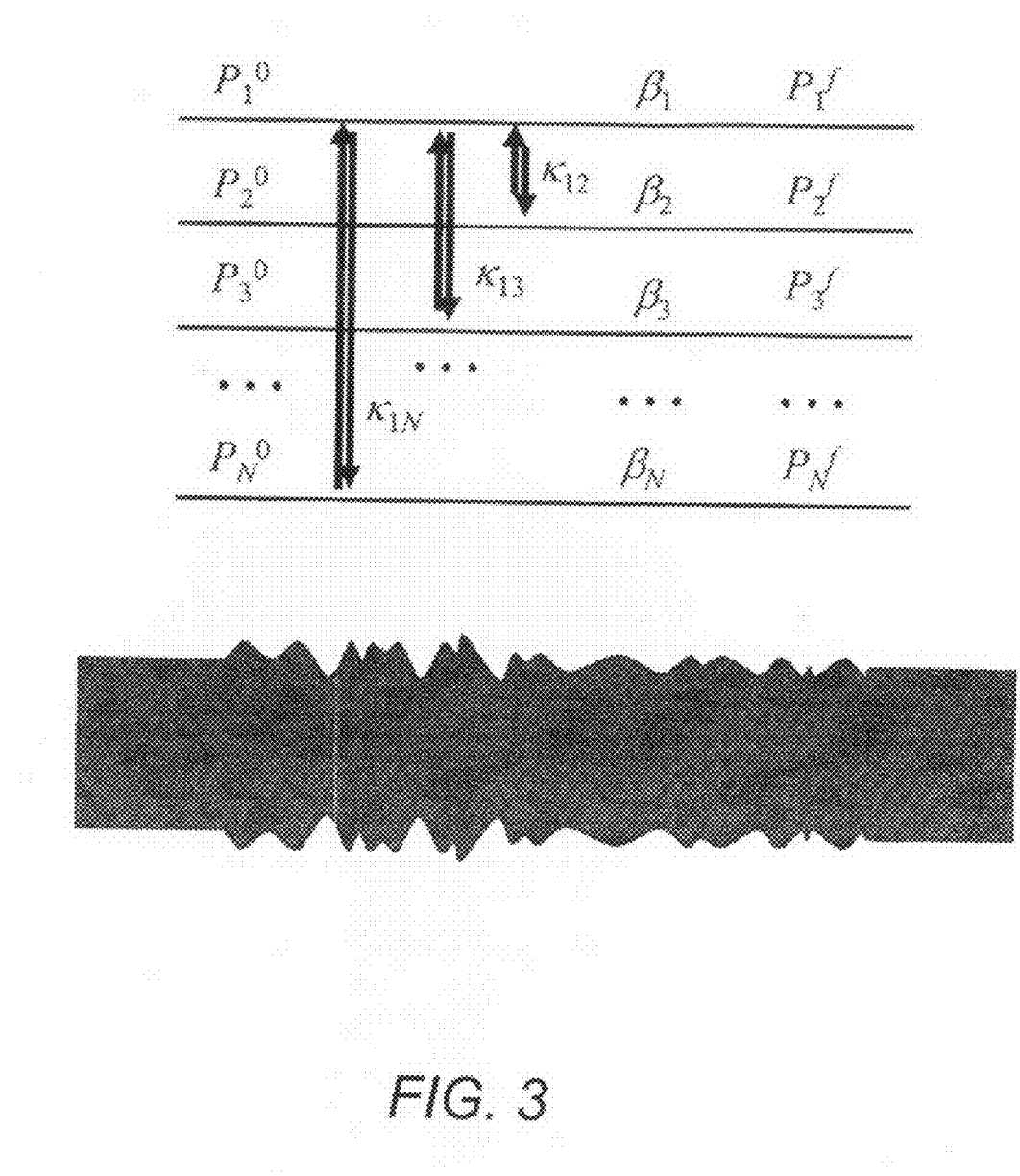
FIG. 3 shows a mode transformer diagram and a schematic form of a mode transformer which is a modified version of the multiple mode transformers of FIG. 2.

In the device of FIG. 2 the mode transformers are arranged serially along the optical fiber length. Alternatively, essentially the same result can be achieved using superimposed LPGs, which simultaneously performs coupling and transformations between several modes. A particular objective may be the conversion of N modes with arbitrary power distribution, $P_1^0, \ldots, P_N^0$, into a single mode 1. The mode conversion diagram and superimposed LPG are illustrated in FIG. 3. In FIG. 3, the physical geometry of the perturbations is a summation of the geometries of the four gratings shown in FIG. 2, superimposed on top of one another. The LPGs are chosen to perform coupling between mode 1 and all other modes, while the intermode coupling between modes, which have numbers greater than one, is zero. The coupling wave equations, which describe the considered system are:

$$\frac{dA_1}{dz} = i(\kappa_{12}A_2 + \kappa_{13}A_3 + \ldots + \kappa_{1N}A_N)$$

$$\frac{dA_2}{dz} = i\kappa_{12}A_1$$

$$\ldots$$

$$\frac{dA_N}{dz} = i\kappa_{1N}A_1$$

(23)

These equations are the generalization of the coupling mode equations, Eq. (5). The initial power distribution is:

$$P_1^0 = |A_1(0)|^2, P_2^0 = |A_1(0)|^2, \ldots, P_N^0 = |A_N(0)|^2.$$ (24)

Solution of Eq. (23) with these boundary conditions leads to the following condition of conversion of all modes into the single mode 1:

$$\tan\left(L\sqrt{\sum_{n=2}^{N} \kappa_{1n}^2}\right) = \frac{i}{A_1(0)} \sqrt{\sum_{n=2}^{N} [A_n(0)]^2},$$ (25)

which can be satisfied only under the condition of the phase shifts:

$$\arg(A_1(0)/A_n(0)) = \pm \frac{\pi}{2}, \quad n = 2, 3, \ldots, N,$$ (26)

Eq. (26) means that the difference between phases of all modes except mode 1 should be equal to zero or $\pi$, while the difference between the phase of mode 1 and the phases of other modes should be $\pm\pi/2$. For the particular case of N=2, Eqs. (25) and (26) coincide with Eq. (20) and (19), respectively. Results show that, using LPG mode transformers, it is possible to convert the arbitrary distributed modes into a single mode if the phases of modes are appropriately tuned. The phases of LPGs can be tuned by shifting the positions of individual LPGs with respect to each other by, for example, using the mechanisms described earlier.

A variety of applications will be found for the mode transformers described here. For example, in cladding pumped devices such as lasers and amplifiers it is useful to transform modes in the gain section to enhance interactions between the signal and the pump energy. Conventional cladding-pumped optical fiber lasers and amplifiers operate with the signal light propagating along the core of the fiber and the signal is amplified with pump light propagating along both the fiber cladding and fiber core. At each cross-section of the fiber, signal amplification is performed only by a fraction of the pump light. For this reason, in the process of pumping, the propagating modes of the pump light are attenuated proportionally to their intensity at the fiber core. In particular, the modes of the pump light, which are propagating primarily along the fiber cladding, are attenuated much less than the modes having significant intensity at the fiber core. To ensure effective pumping, it is important to maximize the intensity of the pump light near the fiber core. Transforming the modes in the gain section using mode transformers of the invention produces a mode pattern where most of the modes can be distributed uniformly along the fiber cross-section, and have a finite intensity in the core region. As a result, for sufficiently long fiber almost all of the pump light can be transformed into signal light. The intensity of pump light is thus maximized at the core region, which is important to perform more effective pumping at shorter fiber lengths.

Figure 4:
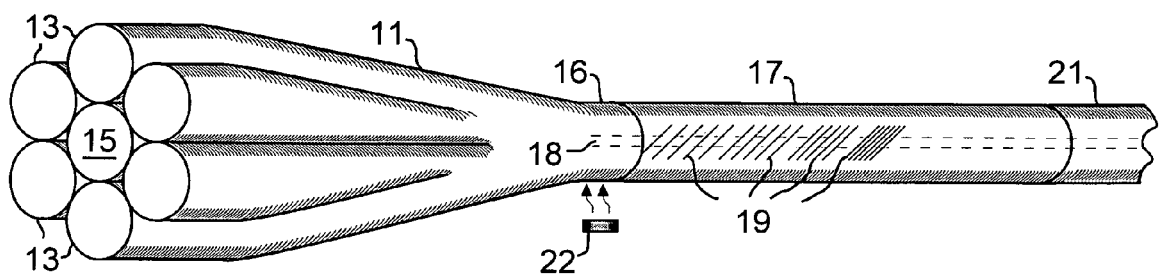
FIG. 4 is an illustration of a cladding pumped device using serially arranged multiple LPG mode transformers.

A cladding pumped device with mode transformers according to the invention is shown in FIG. 4. The device may be either an optical fiber laser device or an optical fiber amplifier device, both of which have a gain section and an optical pump for introducing light energy into the cladding of the gain section. With reference to FIG. 4, a conventional pump combiner section is shown at 11. Pump combiners of this kind are described in detail in U.S. Pat. No. 5,864,644, which is incorporated herein by reference for that description. A plurality of multimode optical pump fibers 13, shown here as six, are bundled in a circular configuration as shown. The optical fiber carrying the signal to be amplified, or the optical fiber with the active laser cavity in the case of a laser device, is shown at 15. In parts of this description, the active waveguide, whether for a laser or an amplifier, will be referred to as the signal fiber. The bundle is fused together, and drawn to produce the combined section shown at 16. In this illustration, the reduction produced by drawing is approximately one-third, and the core of the signal fiber is reduced by approximately one third. The pump combiner section is spliced to a gain section, shown at 17. The optical fiber core is shown in phantom at 18. The gain section 17 has four mode transformers shown schematically at 19. In this embodiment the mode transformers are long period gratings (LPGs). The LPGs extend into the cladding as shown. This may be important if the gratings are to effectively transform higher order modes propagating outside the core. The output fiber is shown at 21. Splices (not shown) connect the various optical fiber sections.

It should be understood that the drawing is not to scale. For example, the gain section 17 is typically much longer.

Figure 5:
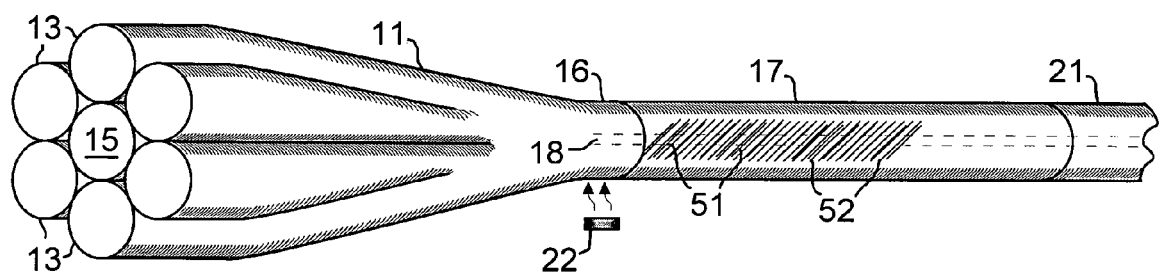
FIG. 5 is an illustration similar to that of FIG. 4 showing superimposed multiple LPG transformers.

The LPG mode transformers 19 may be arranged serially, similar to those in FIG. 2, or may be superimposed, as those in FIG. 3. In both cases the mode transformer elements may be superimposed completely or partially. FIG. 5 shows LPGs that are superimposed. Only two gratings 51 and 52 are shown for clarity. Also for clarity, grating 52 is shown slightly larger than grating 51. In fabricating devices with superimposed gratings the superimposed grating pattern may be formed in discrete steps by forming one grating then superimposing a second, third, etc. gratings on the first, second, etc. grating. Alternatively, the superimposed grating elements may be formed serially in a point to point manner, or may be formed in a single step using a mask pattern comprising superimposed gratings. For any of these cases where multiple LPGs are used, either arranged serially or superimposed, the LPG may be referred to as a complex LPG. A complex LPG is defined as a grating having more than one simple LPG, and having more than one distance between grating elements. In the serial LPG case the distance will be constant for the first grating but will change for the next grating. In the superimposed grating case, the distance between elements will change more or less continuously.

The spacing separating the LPGs in FIGS. 4 and 5, and the placement of the LPG along the optical fiber are relevant parameters in the operation of the device. These can be tuned in the manner described above. A tuning device is shown schematically at 22. In this case the tuning device is shown as a heating element to vary the refractive index of the optical fiber. Other tuning devices may be used.

The construction and design of LPGs is known in the art. Mode converters made using LPGs are described in more detail in U.S. Pat. No. 6,768,835, issued Jul. 27, 2004, which is incorporated herein by reference.

In the embodiment of FIG. 1 a single mode transformer is used with multiple mode inputs and one or more mode outputs. In the embodiment of FIGS. 2-5, multiple mode transformers are used with multiple mode inputs and multiple mode outputs. It should be evident that any number of modes can be processed according to the invention with a very large potential combination of inputs and outputs. The effect of the mode transformers may be to convert the modes to another mode, or to increase or decrease the power ratio between the input modes.

In embodiments described by FIGS. 2-5, the general case where multiple mode inputs and multiple mode outputs are involved is two input modes, two mode transformers and two output modes. This is a basic building block of a very large number of potential devices processing a large number of different mode transformations.

Similar basic building blocks are reciprocals of those described above. Recognizing that LPG devices are reciprocal devices, the inputs and outputs may be reversed. The transformation of a single mode into multiple modes using LPGs will now be described in detail. In this description, the LPG example used is the embodiment of FIG. 5, i.e., superimposed LPGs (SLPGs). It should be understood, as described earlier, that alternatives to SLPGs may be used.

Consider a coherent beam emerging from the SLPG converter positioned at the end of a single mode optical fiber, and in particular, an SLPG consisting of five axially symmetric LPGs that couple six $LP_{0j}$ modes. The output beam generated by a linear combination of these modes is determined using the Fresnel diffraction integral in the form of the Hankel transform:

$$E_{out}(\rho, z) = \frac{2\pi i}{\lambda(z-L)} \exp\left[\frac{2\pi i}{\lambda}(z-L)\right] \quad (27)$$
$$\int_0^R E_{out}(\rho_1, L) \exp\left[\frac{\pi i(\rho_1^2+\rho^2)}{\lambda(z-L)}\right] J_0\left[\frac{2\pi\rho_1\rho}{\lambda(z-L)}\right] \rho_1 d\rho_1,$$
$$\rho = \sqrt{x^2+y^2}.$$

Here R is the fiber radius, $E_o(\rho,L)$ is the field distribution at the end-wall of the fiber, $z=L$, which in this case is a linear combination of six normalized transverse $LP_{0j}$ modes, $e_{oj}^{LP}(\rho)$:

$$E_{out}(\rho, L) = \sum_{j=1}^{6} A_j e_{0j}^{LP}(\rho) \quad (28)$$

Modes $e_{oj}^{LP}(\rho)$ are uniquely determined by the refractive index profile of a fiber. In our modeling, we considered an SMF-28 fiber (R=62.5 μm, $\rho_{core}$=4.1 μm, refractive index difference 0.36%), for which these modes were calculated numerically. The coefficients $A_j$ in Eq. (27) may be optimized to focus the beam in the near field region or to approach a homogeneous beam profile in the far field region.

For the near field case, in order to increase the peak intensity and to suppress the sidelobes, the beam profile determined by Eq. (27) and (28) can be optimized by variation of the complex-valued coefficients $A_j$. In our modeling, the objective function is chosen in the form:

$$F(A_2, A_3, \ldots A_6) = \int_{\rho_m}^{\infty} |E_{out}(\rho, z_0)| d\rho \quad (29)$$

where we set $A_1$=1 in the Eq. (28) for $E_{out}(\rho,z)$. Minimization of $F(A_2, A_3, \ldots A_6)$ was performed at fixed $z_0-L$=0.5 mm and $z_0-L$=1 mm by variation of 5 complex parameters $A_2$, $A_3, \ldots A_6$. The parameter $\rho_m$ defines the region outside the central peak of the emerging beam where the sidelobes are suppressed. In our modeling, we chose $\rho_m$15 μm. The obtained optimum values of $A_j$ are given in Table 1.

TABLE 1

|  | Focused at 0.5 mm | Focused at 1 mm | Far field uniform |
| --- | --- | --- | --- |
| $A_1$ | 1 | 1 | 1 |
| $A_2$ | 0.60253exp(1.53614i) | 1.16235exp(1.61978i) | −0.05548 |
| $A_3$ | 1.07471exp(1.89742i) | 1.80893exp(2.33612i) | −0.14934 |
| $A_4$ | 1.2775exp(2.47505i) | 1.55662exp(−2.82123i) | −0.41936 |
| $A_5$ | 1.11976exp(−2.99339i) | 0.64839exp(−1.16064i) | −0.93562 |
| $A_6$ | 0.59115exp(−2.07753i) | 0.39395exp(2.13461i) | −0.69917 |

Figure 6:
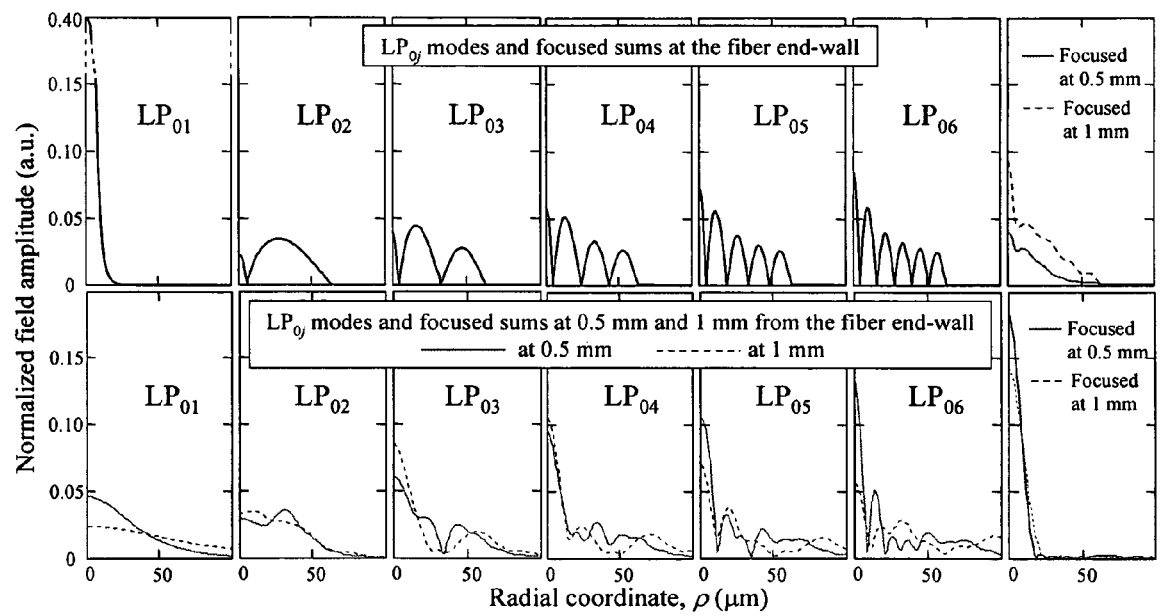
FIG. 6 shows near field distribution profiles of multiple output modes produced from a single input mode.

The corresponding field amplitude profiles at $z_0-L$=0.5 mm and $z_0-L$=1 mm (near field) are shown in FIG. 6 as solid and dashed curves, respectively. The lower row of plots demonstrates significant improvement of the optimized profiles as compared to the profiles of beams generated by individual $LP_{0j}$ modes. Note that, for better visibility, FIG. 6 shows the field amplitude rather that the field intensity distribution. The relative improvement of the optimized field intensity is more apparent.

Table 2 tabulates the fraction of the total beam power inside the 15 mm radius circle at 0.5 mm from the fiber end, and inside the 25 mm radius circle at 1 mm from the fiber end, showing the values for the individual mode beams and the optimized beam.

TABLE 2

|  | $LP_{01}$ | $LP_{02}$ | $LP_{03}$ | $LP_{04}$ | $LP_{05}$ | $LP_{06}$ | Foc. at 0.5 mm | Foc. at 1 mm |
| --- | --- | --- | --- | --- | --- | --- | --- | --- |
| Power inside the 15 μm radius circle at 0.5 mm (%) | 21.9 | 8.2 | 22.5 | 30.2 | 28.6 | 32.0 | 99.0 |  |
| Power inside the 25 μm radius circle at 1 mm (%) | 16.1 | 32.4 | 47.2 | 42.2 | 36.4 | 13.5 |  | 98.3 |

For any of the $LP_{0j}$ modes in Row 2 of Table 2 the power fraction does not exceed 32%. However, it approaches 99% for the optimized beam. Similarly, the power fraction for the $LP_{0j}$ modes in Row 3 this fraction varies between 16% and 43%, but is equal to 98.3% for the optimized beam. Comparison given by FIG. 5 and Table 2 clearly indicates that the suggested SLPG mode converter can serve as an efficient beam focuser.

For the far field case, which is defined by the inequality z'L>>R²/λ, the integral in Eq. (27) is simplified to $$E_{far}(\theta, r) = \frac{2\pi i}{\lambda r}\exp\left\{\frac{2\pi i}{\lambda}r\right\}f(\theta), \quad r = \sqrt{(z-L)^2 + \rho^2}, \quad (30)$$

-continued $$f(\theta) = \int_0^R E_{out}(\rho_1, L)J_0\left[\frac{2\pi\theta\rho_1}{\lambda}\right]\rho_1 d\rho_1, \quad \theta = \frac{\rho}{z-L} << 1.$$

Here the scattering amplitude $f(\theta)$ and the scattering angle $\theta$ are introduced. In numerous applications (e.g. materials processing, laser printing, micromachining in the electronics industry, optical processing) it is desirable to uniformly illuminate a specific volume of space with a laser beam. Following the basic teachings described earlier, the SLPG converter can be used as simple, robust, and efficient all-fiber beam homogenizer. The sum of $LP_{0j}$ modes generated by SLPG, Eq. (28) forms a beam that has a very uniform central region. To address homogenizing of the beam in the far-field region, the objective function may be chosen in the form $$F(A_1, A_2, A_3, \ldots A_6) = \int_0^{\theta_m} |E_{far}(\theta, r_0) - E_0| d\theta \quad (31)$$

Figure 7:
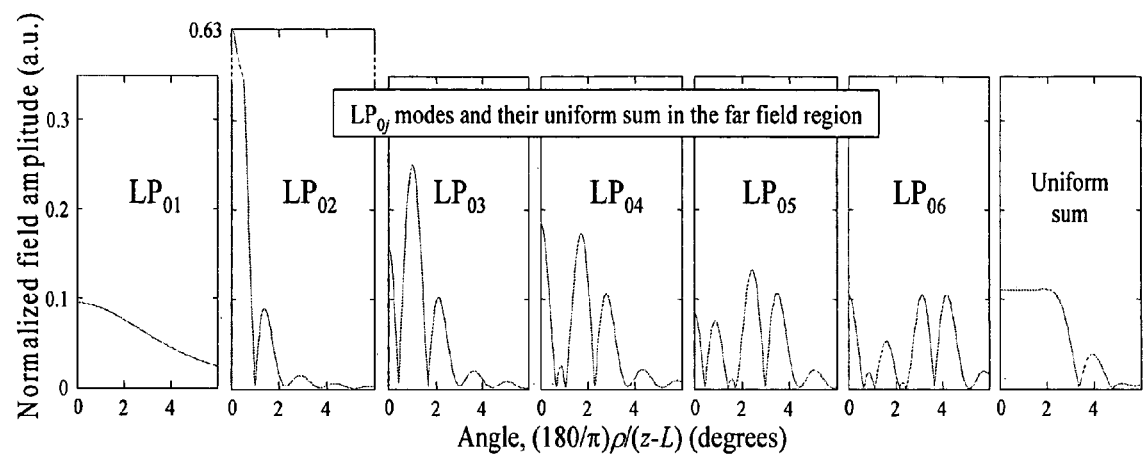
FIG. 7 shows far field distribution profiles of multiple output modes produced from a single input mode.

The function $F(A_1, A_2, A_3, \ldots A_6)$ was minimized by numerical variation of six real variables $A_1, A_2, A_3, \ldots A_6$, choosing the homogenized beam radius, $\theta_m$, and the field amplitude, $E_0$ manually. FIG. 7 compares the far-field amplitude distributions for the first six $LP_{0j}$ modes and their optimized sum. The homogenized beam profile, which is shown in FIG. 7, was obtained for parameters $A_j$ given in column 4 of Table 1. The central peak of the optimized sum has the diameter of 6.8° and 91% of the total beam power. A homogeneous part of this peak, where the relative amplitude nonuniformity does not exceed ±0.2%, has the diameter 4° and 52% of the total beam power. Thus, the considered example demonstrates that SLPG consisting of a reasonable number of gratings can produce extremely homogeneous light beams.

Coefficients $A_j$ in Eq. (28) determine the superposition of output fiber modes to form a beam of the desired shape. The specific design of SLPGs using the example of the homogenized beam considered above may be implemented by determining the SLPG refractive index variation given by:

$$\delta n(x, y, z) = \left[\delta n_0 + \sum_{k=2}^{6}\delta n_{1k}\cos(2\pi z/\Lambda_{1k} + \phi_{1k})\right]\theta(\rho_{core} - \sqrt{x^2 + y^2}) \quad (32)$$

with parameters $\Lambda_{1k}$, $\phi_{1k}$, $\delta n_{1k}$, and $\delta n_0$. Coefficients $A_j$ for this example are given in column 4 of Table 1. Other parameters that determine the SLPG are summarized in Table 3.

TABLE 3

| | j | | | | | |
|---|---|---|---|---|---|---|
| | 1 | 2 | 3 | 4 | 5 | 6 |
| $\beta_j \mu m^{-1}$ | 5.87187 | 5.86328 | 5.86254 | 5.8613 | 5.85958 | 5.85739 |
| $I_{1j}$ | — | 0.03226 | 0.05863 | 0.07999 | 0.09643 | 0.10849 |
| $I_{jj}$ | 0.74511 | 0.00145 | 0.00481 | 0.00907 | 0.01347 | 0.01762 |
| $10^5 \kappa_{1j} \mu m^{-1}$ | — | 0.07952 | 0.21401 | 0.60098 | 1.34084 | 1.00199 |
| $10^5 \delta n_{1j}$ | — | 1.21617 | 1.80099 | 3.70689 | 6.8604 | 4.55656 |
| $10^5 \kappa_{jj} \mu m^{-1}$ | 27.3969 | 0.05319 | 0.17686 | 0.3334 | 0.4954 | 0.64779 |
| $\Lambda_{1j}$ | — | 731.132 | 673.327 | 594.553 | 511.214 | 433.809 |
| $\phi_{1j}$ | — | 0.465312 | 0.527147 | 0.605417 | 0.686417 | 0.762612 |

The values in the Table 3 are calculated as follows. First, the propagation constants of the $LP_{0j}$ modes of an SMF-28 at wavelength λ=1.55 μm are given in row 2. The overlap integrals $I_{1j}$ and $I_{jj}$ for these modes are calculated based on the wave equations using the following.

Assume the SLPG is introduced in the core of the optical fiber by a perturbation of the refractive index, $$\delta n(x, y, z) = \left[\delta n_0 + \sum_{j>k=1}^{N}\delta n_{jk}\cos(2\pi z/\Lambda_{1k} + \phi_{1k})\right]\theta(\rho_{core} - \sqrt{x^2 + y^2}), \quad (33)$$

where x and y are the transverse coordinates, z is the longitudinal coordinate, $\theta(s)$ is a Heaviside step function, $\rho_{core}$ is the core radius, and $\Lambda_{jk}$ are the periods of harmonics. In the coupled wave theory of a weakly guiding fiber, the field can be written in the scalar form $$E(x, y, z) = \sum_j A_j(z)\exp(i\beta_j z)e_j(x, y),$$

where $e_j(x, y)$ are the transverse components of eigenmodes and $\beta_j$ are the propagation constants. It is assumed that the periods $\Lambda_{jk}$ approximately match the differences between the propagation constants of the fiber modes, i.e., $2\pi/\Lambda_{jk} \approx \beta_j - \beta_k$, so that the harmonic (j, k) couples together modes j and k. The coupled mode equation for $A_j(z)$ can be derived from a general coupled mode theory in the form:

$$\frac{dA_j}{dz} = i\sum_{k=1}^{N}\kappa_{jk}\exp\left[i\left(\beta_j - \beta_k + \frac{2\pi}{\Lambda_{jk}}\right)z + i\phi_{jk}\right]A_j, \quad (34)$$

where $\kappa_{jk}$ are the coupling coefficients defined by the following equations:

$$\kappa_{jj} = \frac{\pi \delta n_0}{\lambda} I_{jj}, \quad (35)$$

$$\kappa_{jk} = \frac{\pi \delta n_{jk}}{\lambda} I_{jk}, \quad j \neq k,$$

$$I_{jk} = \int_{\sqrt{x^2+y^2} < \rho_{core}} dx\, dy\, e_j(x,y) e_k(x,y).$$

Here, $\lambda$ is the wavelength of light in free space and the transverse eigenmodes $e_j(x, y)$ are normalized, $$\int_{-\infty}^{\infty}\int_{-\infty}^{\infty} dx\, dy\, e_j^2(x, y) = 1.$$

In Eq. (34), it is assumed that the periods $\Lambda_{jk}$ are positive for $j > k$ and the propagation constants are monotonically decreasing with their number, i.e. $\beta_j < \beta_k$ for $j > k$. In addition, $\phi_{jj} = 0$, $1/\Lambda_{jj} = 0$, $\Lambda_{jk} = -\Lambda_{kj} = -\phi_{kj}$, and, as follows from Eq. (35), $\kappa_{jk} = \kappa_{kj}$.

The values of these integrals are given in rows 3 and 4.

Next, the following equation gives values for the phase shifts, $\phi_{1j}$, the relative values of coupling coefficients, $\kappa_{1j}/\kappa_{12}$, and the corresponding SLPG length L.

$$\phi_{1j} = \gamma_1 - \gamma_j - \kappa_{11} L + \kappa_{jj} L \pm \frac{\pi}{2}, \quad (36)$$

$$\kappa_{1j} = \kappa_{12} \frac{|A_j(L)|}{|A_2(L)|},$$

$$\tan(\mu L) = \pm \frac{|A_2(L)| \mu}{|A_1(L)| \kappa_{12}}.$$

From this equation, the coupling coefficients $\kappa_{1j}$ should be proportional to $A_j$, i.e. $\kappa_{1j} = CA_j$, with a constant C to be determined. In theory, Eqs. (36) allow the length of SLPG, L, to be chosen independently of other parameters. However, smaller L requires stronger gratings and includes less LPG periods. Assuming a reasonable value of L=50 mm. Then with $A_j$ from Table 1, column 4, we find $C = 1.4331 \times 10^{-5} \, \mu m^{-1}$ and the values of coupling coefficients $\kappa_{1j} = CA_j(j>1)$ given in row 5 of Table 3. With the known $\kappa_{1j}$ and $I_{1j}$, from Eq. (35), we find $\delta n_{1j} = \lambda \kappa_{1j}/(\pi I_{1j})$ at $\lambda = 1.55 \, \mu m$, which is given in row 6. Index $\delta n_0$ may be determined from the condition that the overall introduced index variation should be positive:

$$\delta n_0 = \sum_{j>1} |\delta n_{1j}| = 1.8141 \times 10^{-4}.$$

This value of $\delta n_0$ together with $I_{jj}$ from row 4 determines the self-coupling coefficients given in row 7.

The periods of gratings, $\Lambda_{1k}$, in row 8 may be determined from the following:

$$2\pi/\Lambda_{jk} = \beta_k - \beta_j - \kappa_{kk} + \kappa_{jj}, \quad (36)$$

where the self-coupling coefficients, $\kappa_{jj}$, and propagation constants, $\beta_j$, are given in row 6 and 1, respectively. Finally, the LPG phase shifts given in row 9 may be calculated from:

$$\phi_{1j} = (\kappa_{jj} - \kappa_{11}) L + \pi/2. \quad (37)$$

The following table describes the options using the basic building blocks. R refers to the power ratio between modes, $\alpha$ refers to the phase of the input mode, and $\beta$ refers to the phase of the output mode.

|  | INPUT | OUTPUT |
|---|---|---|
| (FIG. 1) | $M_1, M_2$ | $M_1$ |
| (FIGS. 1-4) | $M_1, M_2$ with $R_1$ | $M_1, M_2$ with $R_2$ |
|  | $M_1, M_2$ with $R_1, \alpha_1$ and $\alpha_2$ | $M_1, M_2$ with $R_2, \beta_1$ and $\beta_2$ |
|  | $M_1, M_2$ | $M_1, M_3$ |
|  | $M_1, M_2$ with $R_1$ | $M_1, M_3$ with $R_2$ |
|  | $M_1, M_2$ with $R_1, \alpha_1$ and $\alpha_2$ | $M_1, M_3$ with $R_2, \beta_1$ and $\beta_3$ |
|  | $M_1, M_2$ | $M_3, M_4$ |
|  | $M_1, M_2$ with $R_1$ | $M_3, M_4$ with $R_2$ |
|  | $M_1, M_2$ with $R_1, \alpha_1$ and $\alpha_2$ | $M_3, M_4$ with $R_2, \beta_3$ and $\beta_4$ |
|  | $M_1$ | $M_1 \ldots M_m$ |
|  | $M_1$ | $M_2 \ldots M_n$ |
|  | $M_1, M_2$ | $M_3 \ldots M_o$ |

The value of m will be typically 2 to 10. The value of n will be typically 3 to 10. The value of o will be typically 4-10. In the case where several or many modes are involved the values of R between any pair of modes may vary widely.

It should be understood that the chart above describes basic elements of devices constructed according to the principles of the invention. In many cases, the basic elements, and functions of basic elements, will be combined to produce complex mode transforming devices, and the inputs will be multiplied to produce complex outputs with modified mode patterns. Thus although the claims may minimally specify methods and devices comprising these basic elements, it is contemplated that many methods and devices in practice will have added elements and combinations of elements. It should be understood that these variations and extensions are within the scope of the claims.

As mentioned earlier, a variety of applications exist, or will be found, for the devices described herein. Enhancing the gain characteristics of gain devices is described above. In those applications the LPG mode converters are preferably located in the gain section of the device. Other applications will use mode conversion to change the near field mode pattern at the output of an optical fiber. In these applications the LPG mode converters may be formed, for example, in a pigtail attached at the device output.

The specific waveguides in the embodiments shown in the figures are optical fiber waveguides. However, the equations given above are general waveguide equations and apply to other forms of waveguides as well. For example, the invention may be implemented with planar optical waveguides in optical integrated circuits. These options may be described using the generic expression optical or electromagnetic field waveguide.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:
1. A method comprising:
   a) introducing at least one optical mode $M_1$ into an electromagnetic field waveguide;
   b) using a complex long period grating (LPG) mode transformer, transforming at least a portion of the at least one optical mode $M_1$ into at least two higher order modes $M_x$, and $M_y$, where the modes $M_x$ and $M_y$ and a power ratio and a phase difference among the modes $M_x$ and $M_y$ are determined by preselected properties of the complex LPG mode transformer.

2. The method of claim 1 wherein the complex LPG mode transformer transforms $M_1$ into at least three higher order modes.

3. The method of claim 2 wherein the complex LPG mode transformer comprises at least 3 LPGs.

4. The method of claim 1 wherein step a) defines at least one input mode and step b) defines output modes and the input and output modes are selected from the group consisting of 1-3 in the following table:

| INPUT | OUTPUT |
|---|---|
| 1) $M_1$ | $M_1 \ldots M_m$ |
| 2) $M_1$ | $M_2 \ldots M_n$ |
| 3) $M_1, M_2$ | $M_3 \ldots M_o$. |

5. The method of claim 4 where m is 2 to 10, n is 3 to 10, and o is 4-10.

6. The method of claim 1 where the waveguide is an optical fiber.

7. The method of claim 6 wherein the optical fiber comprises a core and a cladding and the method further includes a step of introducing optical pump radiation into the cladding of the optical fiber.

8. The method of claim 7 wherein a signal is introduced into the optical fiber and the signal is amplified by coupling to the optical pump radiation.

9. The method of claim 7 wherein the optical fiber produces laser light.

10. An optical device comprising:
    a) an optical fiber;
    b) an input to the optical fiber comprising at least one optical mode $M_1$;
    c) a complex LPG mode transformer adapted to transform at least a portion of the at least one optical mode $M_1$ into at least two higher order modes $M_x$, and $M_y$, where the modes $M_x$ and $M_y$ and a power ratio and a phase difference among the modes $M_x$ and $M_y$ are determined by preselected properties of the complex LPG mode transformer.

11. The optical device of claim 10 wherein the complex LPG mode transformer transforms $M_1$ into at least two higher order modes.

12. The optical device of claim 10 wherein the complex LPG mode transformer comprises at least 3 LPGs.

13. The optical device of claim 10 wherein b) defines input modes and c) defines output modes and the input and output modes are selected from the group consisting of 1-3 in the following table:

| INPUT | OUTPUT |
|---|---|
| 1) $M_1$ | $M_1 \ldots M_m$ |
| 2) $M_1$ | $M_2 \ldots M_n$ |
| 3) $M_1, M_2$ | $M_3 \ldots M_o$. |

14. The optical device of claim 13 where m is 2 to 10, n is 3 to 10, and o is 4-10.

15. The optical device of claim 13 wherein the complex LPG mode transformer comprises photoinduced LPGs.

16. The optical device of claim 13 wherein the optical fiber comprises a core and a cladding and further includes an optical pump for introducing pump radiation into the cladding.

17. The optical device of claim 16 wherein the optical fiber is a gain section of an optical fiber laser or amplifier.

18. The optical device of claim 13 wherein the complex LPG mode transformer comprises superimposed LPGs.

19. The optical device of claim 13 wherein the output modes produce a beam with uniform intensity in a far field.

20. The optical device of claim 13 wherein the output modes produce a beam with uniform intensity in a near field.

21. The optical device of claim 13, wherein the complex LPG mode transformer comprises LPGs disposed serially.

22. The method of claim 3, wherein the complex LPG mode transformer comprises superimposed LPGs.

23. The method of claim 3, wherein the complex LPG mode transformer comprises LPGs disposed serially.

* * * * *